US012686390B2

(12) United States Patent
Kumano et al.

(10) Patent No.: US 12,686,390 B2
(45) Date of Patent: Jul. 21, 2026

(54) VEHICLE POSITION ESTIMATION DEVICE

(71) Applicant: DENSO CORPORATION, Kariya-city (JP)

(72) Inventors: Shunya Kumano, Nisshin-city (JP); Takeshi Shikimachi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 104 days.

(21) Appl. No.: 17/933,256

(22) Filed: Sep. 19, 2022

(65) Prior Publication Data

US 2023/0086589 A1    Mar. 23, 2023

(30) Foreign Application Priority Data

Sep. 22, 2021    (JP) .................................. 2021-154533

(51) Int. Cl.
*B60W 30/18*        (2012.01)

(52) U.S. Cl.
CPC ................. *B60W 30/18163* (2013.01); *B60W 2554/4041* (2020.02); *B60W 2554/80* (2020.02); *B60W 2556/45* (2020.02)

(58) Field of Classification Search
CPC ... B60W 30/18163; B60W 2554/4041; B60W 2554/80; B60W 2556/45; G01C 21/3602; G01C 21/3658; G01C 21/30
See application file for complete search history.

(56) References Cited

U.S. PATENT DOCUMENTS

2007/0021912 A1*    1/2007    Morita ............... G01C 21/3602
                                                        701/431
2011/0169958 A1     7/2011    Imai et al.
2016/0171893 A1*    6/2016    Chen .................... G08G 1/0112
                                                        701/300
2016/0314358 A1*   10/2016    Kushida ................ B60W 30/12
                              (Continued)

FOREIGN PATENT DOCUMENTS

EP          3859677 A     4/2021
JP          2017-033270 A 2/2017

OTHER PUBLICATIONS

U.S. Appl. No. 17/933,252 and its entire file history, filed 2022-09-19, Kumano et al.

*Primary Examiner* — Faris S Almatrahi
*Assistant Examiner* — Moises Gasca Alva
(74) *Attorney, Agent, or Firm* — Precision Patents, P.C.

(57)        ABSTRACT

A vehicle position estimation device includes an external information acquisition unit, a vehicle parameter acquisition unit, a map data acquisition unit, a lane change determination unit, and a position estimation unit. The external information acquisition unit acquires external information. The vehicle parameter acquisition unit acquires a vehicle parameter related to traveling. The map data acquisition unit acquires map data. The lane change determination unit determines whether the vehicle is changing lanes. The position estimation unit estimates a self-position of the vehicle on a map. When the lane change determination unit determines that the vehicle is changing lanes, the position estimation unit estimates the self-position using dead reckoning. When the lane change determination unit determines that the vehicle is not changing lanes, the position estimation unit estimates the self-position based on the external information and the map data.

10 Claims, 6 Drawing Sheets

(56) References Cited

U.S. PATENT DOCUMENTS

| | | | |
|---|---|---|---|
| 2017/0113696 A1* | 4/2017 | Oh | G06V 10/462 |
| 2017/0176598 A1* | 6/2017 | Ichinokawa | G01S 19/45 |
| 2018/0045519 A1* | 2/2018 | Ghadiok | G06T 7/74 |
| 2018/0051992 A1* | 2/2018 | Croyle | B60W 30/12 |
| 2018/0107884 A1* | 4/2018 | Kinoshita | G06V 20/582 |
| 2018/0165525 A1* | 6/2018 | Hamada | G01C 21/30 |
| 2020/0003563 A1 | 1/2020 | Miyake et al. | |
| 2020/0003567 A1 | 1/2020 | Minamiguchi et al. | |
| 2020/0250438 A1* | 8/2020 | Schachter | G01S 17/931 |
| 2020/0393571 A1* | 12/2020 | Park | B60W 40/10 |
| 2023/0286583 A1* | 9/2023 | Uemura | B62D 15/0255 |

* cited by examiner

VEHICLE POSITION ESTIMATION DEVICE

CROSS REFERENCE TO RELATED APPLICATION

The present application is based on Japanese Patent Application No. 2021-154533 filed on Sep. 22, 2021, the entire disclosure of which is incorporated herein by reference.

TECHNICAL FIELD

The disclosure in this specification relates to a vehicle position estimation device that estimates a self position of a vehicle traveling on a road.

BACKGROUND

A self-position estimation device for a vehicle estimates a traveling lane of the vehicle.

SUMMARY

According to at least one of embodiment, a vehicle position estimation device mounted on a vehicle includes an external information acquisition unit, a vehicle parameter acquisition unit, a map data acquisition unit, a lane change determination unit, and a position estimation unit. The external information acquisition unit acquires external information regarding objects and road markings around the vehicle. The vehicle parameter acquisition unit acquires a vehicle parameter related to traveling of the vehicle. The map data acquisition unit acquires map data including road information about lanes. The lane change determination unit determines whether the vehicle is changing lanes based on the external information, the vehicle parameter, and the map data. The position estimation unit estimates a self-position of the vehicle on a map based on the external information, the vehicle parameter, and the map data. When the lane change determination unit determines that the vehicle is changing lanes, the position estimation unit estimates the self-position using dead reckoning by which the self-position is sequentially updated based on the vehicle parameter. When the lane change determination unit determines that the vehicle is not changing lanes, the position estimation unit estimates the self-position based on the external information and the map data.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

To begin with, examples of relevant techniques will be described. A self-position estimation device according to an example that determines which lane of lanes identified by lane information corresponds to an in-lane position of a vehicle based on mutual relationships between the in-lane position and an absolute position including an error. The self-position estimation device then estimates a traveling lane based on a result of this determination.

In the technique described above, when a result of the estimation of the in-lane position by a gyro sensor has an error larger than a lane width, an accuracy in estimation of a lane candidate may deteriorate. As a result, the accuracy of the position estimation may also deteriorate.

In contrast, according to the present disclosure, a vehicle position estimation device having an excellent accuracy in position estimation can be provided.

A vehicle position estimation device includes a position estimation unit that estimates a self-position of a vehicle on a map based on an external information, a vehicle parameter, and map data. The position estimation unit estimates the self-position using either a first method or a second method. The first method estimates the self-position using dead reckoning by which the self-position is sequentially updated based on the vehicle parameter. The second method estimates the self-position based on the external information and the map data. More specifically, the position estimation unit uses the first method when the vehicle is changing lanes, and uses the second method when the vehicle is not changing lanes. As a duration of the first method becomes longer, a cumulative error increases and position estimation accuracy decreases. However, when the vehicle is changing lanes, a recognition of the lane with external information becomes unstable, so the first method may be better than the second method using external information. Therefore, since the duration of the first method is set within the time when the vehicle is changing lanes, the duration can be shortened, and the cumulative error can be reduced. As a result, the position estimation accuracy can be increased.

First Embodiment

Hereinafter, a first embodiment of the present disclosure will be described with reference to FIGS. 1 to 7. A vehicle position estimation device 100 of the present embodiment is equipped, for example, as a part of a vehicle system 10 in a vehicle which has a navigation system or a vehicle which has an autonomous driving function. The vehicle position estimation device 100 estimates a self-position which is a vehicle position on the map, and more specifically, estimates which lane and which road a vehicle 200 travels based on various data described below during traveling of the vehicle 200. The vehicle position estimation device 100 outputs the self-position including an estimated lane to another device.

Figure 1:
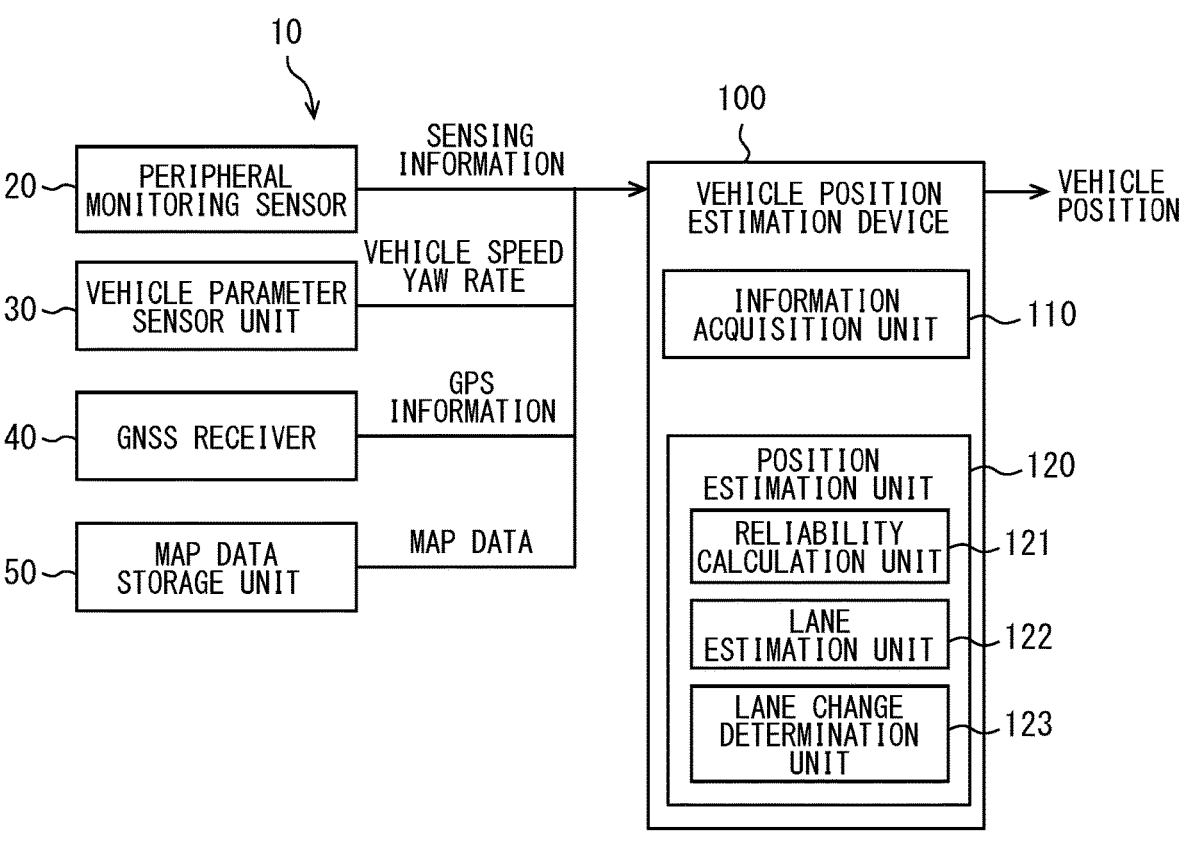
FIG. 1 is a block diagram showing a vehicle system.

The vehicle position estimation device 100 estimates the self-position of the vehicle 200 to support driver's safety driving and autonomous driving, for example. The vehicle 200 corresponds to an automobile. As shown in FIG. 1, the vehicle system 10 includes a peripheral monitoring sensor 20, a vehicle parameter sensor unit 30, a GNSS (Global Navigation Satellite System) receiver 40, a map data storage unit 50, and the vehicle position estimation device 100.

Figure 2:
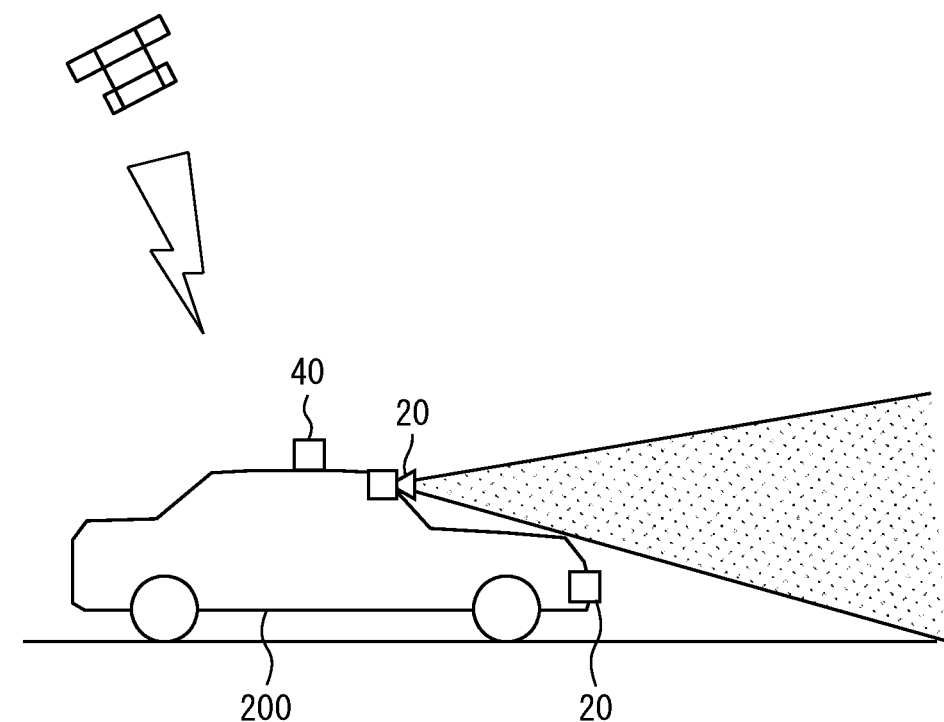
FIG. 2 is a diagram showing a side view of a vehicle.

As shown in FIG. 2, the peripheral monitoring sensor 20 is a sensor that monitors the surrounding environment of the vehicle 200. The peripheral monitoring sensor 20 is capable of detecting moving objects and stationary objects in a detection range around the vehicle 200. The moving objects include pedestrians, cyclists, non-human animals, and other vehicles, for example. The stationary objects include falling objects on the road, guardrails, curbs, road signs, road surface markings, and structures beside the road, for example. The peripheral monitoring sensor 20 outputs sensing information, which is external information regarding objects around the vehicle 200, to the vehicle position estimation device 100.

The peripheral monitoring sensor 20 acquires the external information regarding objects and road markings around the vehicle 200. More specifically, the peripheral monitoring sensor 20 detects information about longitudinal markings adjacent to both sides of the vehicle 200, the number of lanes on the road, and the numbers of lanes located on both sides of the vehicle 200. Further, the peripheral monitoring sensor 20 acquires mark information such as frontward road surface markings on the traveling lane of the vehicle 200, and distances from the vehicle 200 to the road edges located rightward and leftward of the vehicle 200.

The peripheral monitoring sensor 20 includes a front camera, millimeter wave radars as detection configurations for detection of an object. The front camera outputs, as the sensing information, image data obtained by photographing a front range of the vehicle 200, an analysis result of the image data, or both the image data and the analysis result. The multiple millimeter wave radars are arranged, for example, on each of the front and rear bumpers of the vehicle 200 at intervals from each other. The millimeter wave radars radiate a millimeter wave or a quasi-millimeter wave toward the surroundings of the vehicle 200. The millimeter wave radars generate the sensing information by a process of receiving reflected waves reflected by moving objects, stationary objects, or the like.

The vehicle parameter sensor unit 30 detects vehicle parameters related to traveling of the vehicle 200, for example, vehicle speed, acceleration, yaw rate, and the like. The vehicle parameter sensor unit 30 outputs detected data of the vehicle parameters to the vehicle position estimation device 100.

As shown in FIG. 2, the GNSS receiver 40 receives positioning signals from artificial satellites. Artificial satellites are also called positioning satellites. The GNSS receiver 40 is capable of receiving positioning signals from positioning satellites of at least one of multiple satellite positioning systems such as GPS, GLONASS, Galileo, IRNSS, QZSS, and Beidou. The GNSS receiver 40 outputs received positioning signals as GPS information to the vehicle position estimation device 100.

The map data storage unit 50 stores map data. The map data storage unit 50 is connected to the vehicle position estimation device 100, and the vehicle position estimation device 100 is capable of reading the map data from the map data storage unit 50. The map data defines a map on which roads are expressed by links and nodes. More specifically, in the map data, each link is a segment having a predetermined length along a road, and the links are sequentially connected via the nodes.

The map data is data showing a so-called high-precision three-dimensional map, and is a precise 3D mapped data of the roads and its surroundings. The map data includes road information about the roads. The road information includes number of lanes, a lane position, a lane shape, and mark information. The mark information is information such as symbols, arrows and figures provided on a road surface, and includes information on the road surface markings. In addition to road surface markings stipulated by laws such as the Road Traffic Act, the mark information includes information such as figures used only in specific areas. The information of the road surface markings includes information of longitudinal markings and road markings.

The longitudinal markings include an edge line and a lane line. The edge line is a longitudinal marking that indicates a boundary between a roadway and a road shoulder, and is indicated by a solid line. The lane line is a longitudinal marking that indicates a boundary between lanes and is indicated by solid or broken lines. The information on the longitudinal marking also includes information on the line color, such as yellow and white. Road markings are paints drawn on a road surface for traffic control and traffic regulation, such as turning prohibition, traffic division according to a traveling direction, and maximum speed.

The map data includes information on a non-lane section, which is a section where no lanes are marked on the road. In the non-lane section, the lane line is not shown, only the edge line is shown. The information on the non-lane section includes information indicating a length of the non-lane section and information indicating a position of the non-lane section.

For example, the map data storage unit 50 may be provided by a cloud server instead of a storage included in the vehicle position estimation device 100. The cloud server may transmit the map data to the vehicle position estimation device 100 in order to achieve the function of the map data storage unit 50.

The vehicle position estimation device 100 generates highly precise position information of the vehicle 200 by a combined positioning method that combines multiple types of acquired information. Further, the vehicle position estimation device 100 estimates one traveling lane in which the vehicle 200 travels on a road including multiple lanes.

The vehicle position estimation device 100 is a control device that executes a program stored in a storage medium and controls each unit. The vehicle position estimation device 100 includes at least one calculation processing device (i.e. CPU), and the storage medium for storing a program and data. The vehicle position estimation device 100 is provided by a microcontroller including a computer-readable storage medium. The storage medium is a non-transitional substantive storage medium that stores computer-readable programs and data non-temporarily. The storage medium is realized by a semiconductor memory, a magnetic disk, or the like.

The vehicle position estimation device 100 has an information acquisition unit 110 and a position estimation unit 120 as functional blocks. The information acquisition unit 110 acquires the sensing information from the peripheral monitoring sensor 20, vehicle parameter data from the vehicle parameter sensor unit 30, the GPS information from the GNSS receiver 40, and the map data from the map data storage unit 50. Therefore, the information acquisition unit 110 functions as an external information acquisition unit, a vehicle parameter acquisition unit, a satellite positioning acquisition unit, and a map data acquisition unit. The information acquisition unit 110 outputs the acquired information to the position estimation unit 120.

The position estimation unit 120 estimates the self-position of the vehicle 200 on the map based on the sensing data, the vehicle parameter data, the GPS information, and the map data. For example, the position estimation unit 120 estimates a latitude and longitude indicating a current position of the vehicle 200 from the GPS information acquired by the GNSS receiver 40. Based on the vehicle parameter data detected by the vehicle parameter sensor unit 30, the position estimation unit 120 determines whether the vehicle 200 is traveling on a straight road, estimates a curvature of a road on which the vehicle 200 is traveling, or determines whether the vehicle 200 travels out of the lane.

The position estimation unit 120 estimates the self-position by using a dead reckoning method and a map data method. The dead reckoning method is a method of estimating the self-position by using dead reckoning in which the self-position is sequentially updated based on the vehicle parameter data. More specifically, in the dead reckoning method, first a position relative to a previous position is calculated based on the vehicle speed and a traveling direction included in the vehicle parameter, and next the self-position is determined by sequentially updating the self-position based on the calculated relative position.

The map data method is a method of estimating the self-position based on the external information and the map data. More specifically, in the map data method, external information, for example, image data obtained by an in-vehicle camera is collated with the map data, and the estimated position on the map data is calculated using the collation result.

The position estimation unit 120 has a reliability calculation unit 121, a lane estimation unit 122, and a lane change determination unit 123 as sub-functional blocks. The reliability calculation unit 121 calculates a reliability for each lane when the vehicle 200 is traveling on a road having multiple lanes. The reliability of each lane indicates a probability of the vehicle 200 being traveling in the lane among the lanes.

The lane estimation unit 122 estimates a lane in which the vehicle 200 is located by using the reliability calculated by the reliability calculation unit 121. The lane estimation unit 122 determines, for example, a lane having the highest reliability among lanes as the lane in which the vehicle 200 is located. The lane estimation unit 122 does not limit the number of lanes in which the vehicle 200 is located to one, for example, when there are more than two lanes having the highest reliability.

The lane change determination unit 123 determines an occurrence of a lane change of the vehicle 200 based on the sensing information, the vehicle parameter, the GPS information, and the map data. The lane change is a change in traveling lane by the vehicle 200 moving from a lane to an adjacent lane on a right side or left side. The lane change determination unit 123 also determines whether the vehicle 200 is changing lanes.

Next, the calculation of the reliability will be described. In the example shown in FIG. 3, the position estimation unit 120 estimates that the vehicle 200 is currently traveling in a first lane L1 of a four-lane road. However, in reality, the vehicle 200 is traveling in a second lane L2. According to the sensing information, the longitudinal markings adjacent to both sides of the vehicle 200 are both broken lines. The map data contains information on the longitudinal markings of the road that the vehicle is traveling, and the information indicates five longitudinal markings. And, the line types of the five longitudinal markings are as follows: the leftmost and rightmost longitudinal markings are solid lines, and the middle three are broken lines. Therefore, a lane having broken longitudinal markings on both sides can be the second lane L2 or the third lane L3. If the vehicle is traveling in the first lane L1, the left longitudinal marking should be a solid line and the right longitudinal marking should be a broken line.

Figure 3:
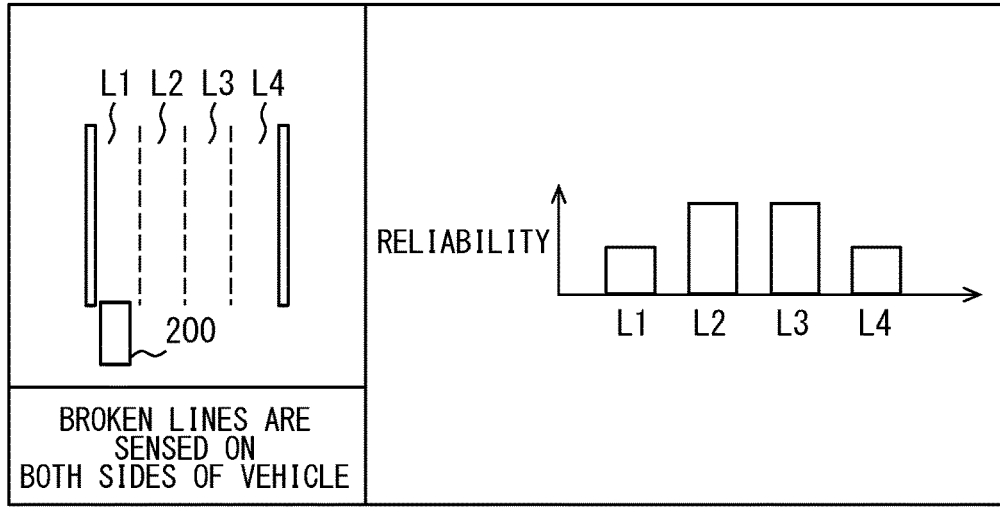
FIG. 3 is a diagram showing an example of a reliability calculation method using longitudinal markings.

Comparing the longitudinal marking information between the sensing information and the map data, the sensing information matches the information on the second lane L2 and the information on the third lane L3, but does not match the information on the first lane L1 and the information on the fourth lane L4. Therefore, in this case, the probabilities of the vehicle 200 being in the second lane L2 and the third lane L3 are higher than the probabilities of the vehicle 200 being in the first lane L1 and the fourth lane L4. Therefore, as shown in FIG. 3, the reliability indicating the probability is set to be higher in the second lane L2 and the third lane L3 than in the first lane L1 and the fourth lane L4. As a result, the position estimation unit 120 determines that the vehicle 200 is not in the first lane L1 using the calculated reliability, and re-estimates that the vehicle 200 is located in the second lane L2 or the third lane L3.

In this way, in the reliability calculation unit 121, information on longitudinal markings adjacent to both sides of the vehicle 200 obtained from the sensing information is compared with information on longitudinal markings of the map data. Then, in the reliability calculation unit 121, a reliability of a lane having longitudinal markings on both sides that matches with longitudinal markings of the map data is set to be higher than a reliability of a lane having longitudinal markings on both sides that does not match the longitudinal markings of the map data. The reliability calculation unit 121 determines the reliability using also, for example, a color of the longitudinal marking. The reliability calculation unit 121 determines whether the sensing information matches the information contained in the map data, depending on whether the longitudinal markings adjacent to both sides of the vehicle 200 are white or yellow, and sets the reliability.

Figure 4:
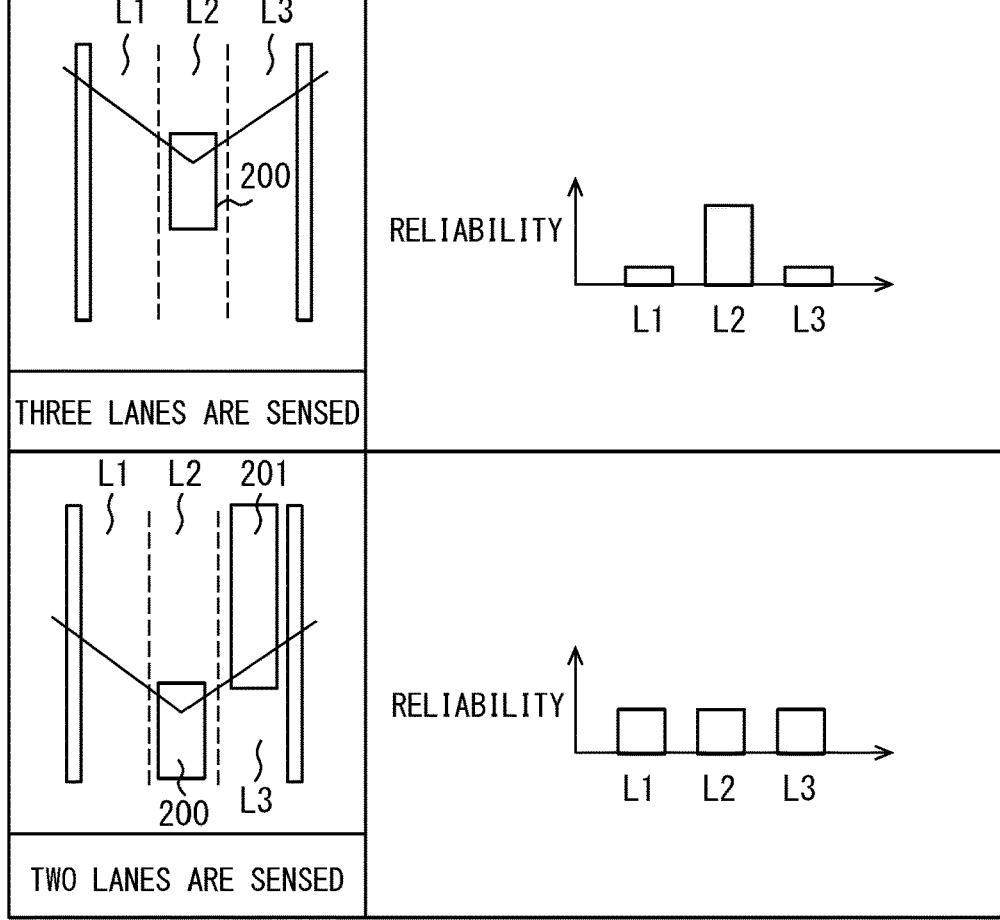
FIG. 4 is a diagram showing an example of a reliability calculation method using number of lanes.

Next, a reliability calculation method using the number of lanes will be described. As shown in FIG. 4, the vehicle 200 is traveling in the second lane L2 on a three-lane road. The sensing information includes a total number of lanes on the road on which the vehicle 200 is traveling, the number of lanes located on the left side of the vehicle 200, and the number of lanes located on the right side of the vehicle 200. Since the sensing information includes longitudinal marking information, the number of lanes is acquired using the number of longitudinal markings. In the example shown in FIG. 4, if the sensing information is appropriate, the number of lanes on the left side is one and the number of lanes on the right side is one.

Since the number of lanes of the traveling road is identified as three from the map data, the reliability calculation unit 121 is capable of estimating the traveling lane of the vehicle 200 from the numbers of lanes on both sides obtained from the sensing information. More specifically, when traveling in the first lane L1 of the three-lane road, the number of lanes on the left side is zero, and the number of lanes on the right side is two. When traveling in the second lane L2 of the three-lane road, the number of lanes on the left side is one, and the number of lanes on the right side is one. Further, when traveling in the third lane L3 of the three-lane road, the number of lanes on the left side is two, and the number of lanes on the right side is zero. Therefore, the reliability calculation unit 121, by using the detected number of lanes, increases the reliability of the traveling lane and decreases the reliability of the other lanes.

However, the peripheral monitoring sensor 20 may not be able to detect the number of lanes correctly. For example, if another vehicle 201 is driving in a lane adjacent to a right side of the vehicle 200, the right lane is not capable of being recognized, and the peripheral monitoring sensor 20 may detect the number of lanes such that the number of lanes on a left side of the vehicle 200 is one and the number of lanes on the right side of the vehicle 200 is zero using the sensing information. Therefore, since the detected number of lanes is different from the number of lanes in the map data, the reliability calculation unit 121 is not capable of determining the reliability of each lane.

Therefore, when the number of lanes in the map data and the total number of lanes in the sensing information match each other, as described above, the reliability of the lane that matches the map data in terms of the numbers of lanes on both sides is set to be higher than a reliability of the other lanes that do not match the map data. On the contrary, when the number of lanes in the map data and the total number of lanes in the sensing information do not match each other, there is a possibility that the sensing information is incorrect, so the reliability calculation unit 121 determines the reliability of all lanes to be equal.

In short, the reliability calculation unit 121 compares the total number of lanes in the sensing information with the total number of lanes in the map data. When the acquired total number of lanes matches the number of lanes in the map data, a reliability of a lane which is specified as a traveling lane of the vehicle 200 from the numbers of lanes on both sides of the vehicle 200 is set to be higher than the reliability of the other lanes by the reliability calculation unit 121.

Figure 5:
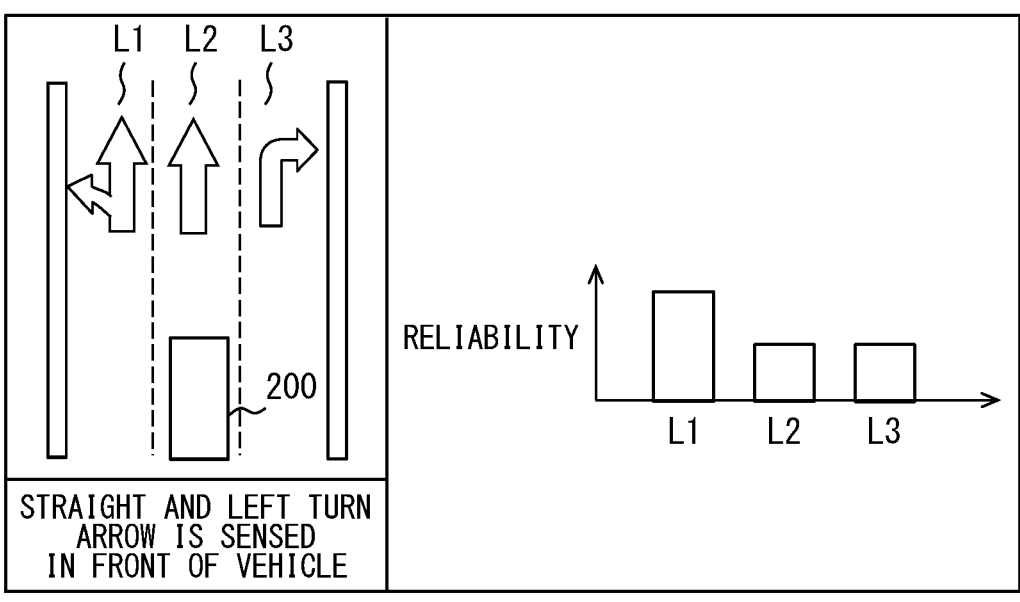
FIG. 5 is a diagram showing an example of a reliability calculation method using a road marking.
Figure 6:
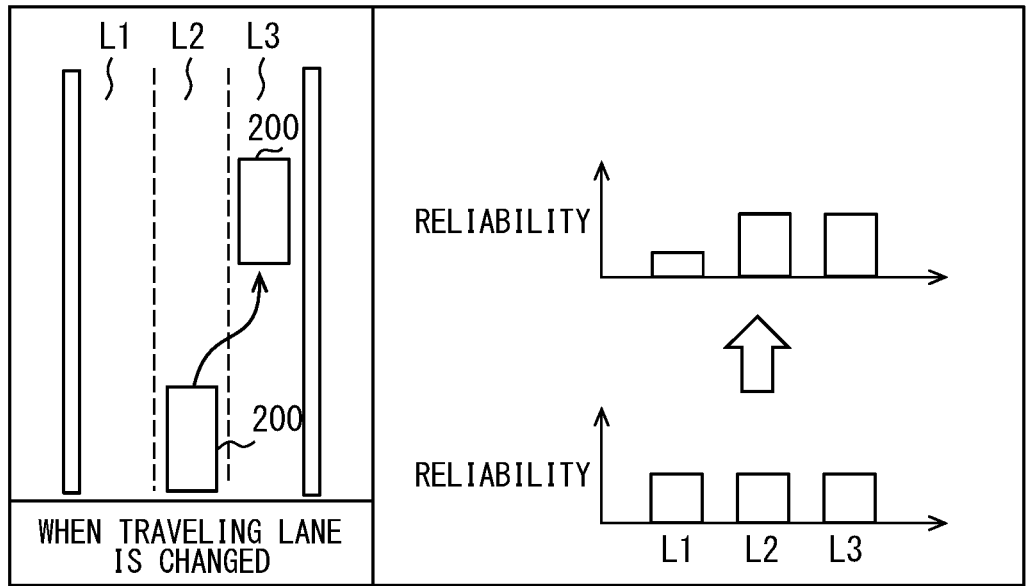
FIG. 6 is a diagram showing an example of a reliability calculation method using a lane change.

Next, a reliability calculation method using road markings will be described. In the example shown in FIG. 5, the position estimation unit 120 currently estimates that the vehicle 200 is in the second lane L2 that is a center lane of a three-lane road. However, in reality, the vehicle 200 is traveling in the first lane L1. Then, in the sensing information, a road surface marking in front of the vehicle 200 is a straight and left turn arrow. In the map data, the straight and left turn arrow is stored as a road surface marking located in the first lane L1. Therefore, the road surface marking in front of the vehicle 200 in the sensing information do not match the road surface marking included in the map data. If the vehicle 200 is traveling in the second lane L2, the road surface marking in front of the vehicle 200 should be a straight arrow. Therefore, in this case, as shown in FIG. 5, the reliability of the first lane L1 having a road surface marking that matches the straight and left turn arrow is set to be higher than a reliability of the second lane L2 and a reliability of the third lane L3 which do not have the matching road surface marking.

In short, the reliability calculation unit 121 compares the road surface markings included in the sensing information with the road surface markings included in the map data. Then, a reliability of a lane having a road surface marking that matches an acquired road surface marking is set to be higher than a reliability of a lane which does not have the matching road surface marking. As a result, the position estimation unit 120 re-estimates that the vehicle 200 is in the first lane L1 by using the reliability.

Next, a reliability calculation method using a lane changes will be described. In the example shown in FIG. 6, the position estimation unit 120 estimates that the vehicle 200 is currently traveling in a center lane of a three-lane road. In reality, the vehicle 200 is also traveling in the second lane L2. Then, a case in which the lane change determination unit 123 determines that the traveling lane has been changed rightward of the vehicle 200 will be described.

When the lane change determination unit 123 determines that the traveling lane has been changed rightward, the probability of being in the first lane L1 is lower than the probabilities of being in the second lane L2 and the third lane L3. Conversely, when the lane change determination unit 123 determines that the traveling lane has been changed to leftward, the probability of being in the third lane L3 is lower than the probabilities of being in the first lane L1 and the second lane L2. Therefore, in the example shown in FIG. 6, since the vehicle 200 changed the traveling lane rightward, the probabilities of being in the second lane L2 and the third lane L3 is calculated to be higher than a probability of being in the first lane L1.

When the vehicle 200 is traveling in a two-lane road and the lane change determination unit 123 determines that the traveling lane has been changed rightward, the probability of being in the first lane L1 is lower than the probability of being in the second lane L2. Conversely, when the lane change determination unit 123 determines that the traveling lane has been changed leftward, the probability of being in the second lane L2 is lower than the probability of being in the first lane L1.

In short, when the lane change determination unit 123 determines that the traveling lane has been changed, a reliability of a lane located at an end in a direction opposite to a direction of the lane change is set to be lower than a reliability of another lane by the reliability calculation unit 121.

As described above, the reliability calculation unit 121 calculates the reliabilities of each lane using the number of lanes, the road surface markings, and the lane changes. Then, the reliability calculation unit 121 calculates an integrated reliability by integrating the reliabilities, which are calculated by using different features, using a weighting factor for the reliabilities. For example, the reliability using the road surface markings is set to be more important than the reliability using the lane changes. Then, the weighting factor for the reliability using the road surface marking is set to be high. Accordingly, the position estimation unit 120 is capable of estimating the traveling lane in which the vehicle 200 is traveling using the integrated reliability.

Next, a lane change determination method of the lane change determination unit 123 will be described. As a first determination method, the lane change determination unit 123 determines that a lane change has occurred when the vehicle 200 travels across a longitudinal marking during the longitudinal marking being detected. As a second determination method, the lane change determination unit 123 determines that a lane change has occurred when the vehicle 200 is traveling near a center of a traveling lane, a distance between the center of the traveling lane and a center position of the vehicle 200 is increasing, and the distance exceeds a predetermined threshold.

As a third determination method, the lane change determination unit 123 determines whether the vehicle 200 is changing lanes toward one of road edges by using decrease in distance from the vehicle 200 to the one of road edges or increase in distance from the vehicle 200 to the other of the road edges. The third determination method is an effective method when the peripheral monitoring sensor 20 is not capable of recognizing longitudinal markings but recognizing the road edges. The longitudinal markings may be difficult to be detected due to deterioration of the lane markings or presence of puddles, but the road edges are often easy to be detected due to steps and the like.

Figure 7:
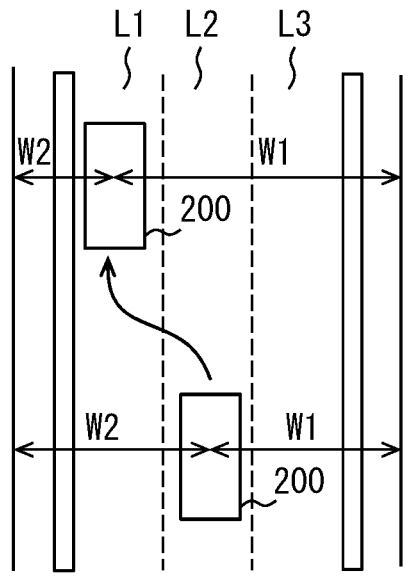
FIG. 7 is a diagram showing an example of a lane change determination method.

More specifically, as shown in FIG. 7, the peripheral monitoring sensor 20 detects a left edge distance W2 from a center of the vehicle 200 to a left road edge and a right edge distance W1 from the center of the vehicle 200 to a right road edge as the distances to the road edges. When the traveling lane is changed leftward as shown in FIG. 7, the left edge distance W2 decreases, and the right edge distance W1 increases with the decrease of the left edge distance W2. Then, when an amount of the decrease or increase exceeds the threshold, the lane change determination unit 123 determines that the vehicle 200 has changed lanes.

As a fourth determination method, the lane change determination unit 123 determines that the vehicle 200 is not changing lanes and has completed the lane change when a lane having a highest reliability calculated by the reliability calculation unit 121 among the lanes changes from one lane to another. The reliability is calculated for each lane, and if there is a lane with high reliability, a probability of the vehicle 200 being located in that lane is high. Therefore, when a lane with high reliability is changed to another lane, the lane change determination unit 123 determines that the traveling lane has been changed.

In this manner, the lane change determination unit 123 determines a lane change using the above four determination methods. The lane change determination unit 123 may determine occurrence of a lane change using only one of the four determination methods, or may determine a lane change by combining determination results of two or more determination methods.

The lane change determination unit 123 also determines whether a vehicle is changing lanes. In the first determination method, the lane change determination unit 123 determines that the vehicle 200 is changing lanes when vehicle 200 is crossing the longitudinal marking. In the second determination method, the lane change determination unit 123 determines that the vehicle 200 is changing lanes when the distance between the center of the traveling lane and the center position of the vehicle 200 exceeds a threshold and is increasing.

In the third determination method, the lane change determination unit 123 determines whether the vehicle 200 is changing lanes toward one of road edges by using decrease in distance to the one of the road edges or increase in distance to the other of the road edges. For example, in the third determination method, the lane change determination unit 123 determines that the vehicle 200 is changing lanes when the distances from the vehicle to the road edges exceeds a threshold and is increasing or decreasing.

In the fourth determination method, the lane change determination unit 123 determines that the vehicle 200 is not changing lanes and has completed the lane change when a lane having a highest reliability calculated by the reliability calculation unit 121 among the lanes changes from one lane to another. This determination is based on a presumption that the change of the lane having the highest reliability means a completion of the lane change. This determination is based on a fact that the reliability cannot be updated during a lane change.

Figure 8:
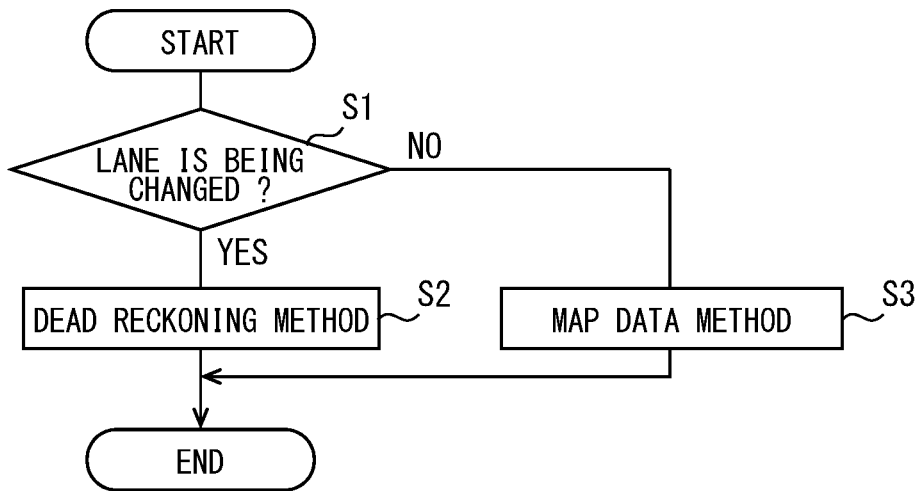
FIG. 8 is a flowchart illustrating switching of position estimation methods.
Figure 9:
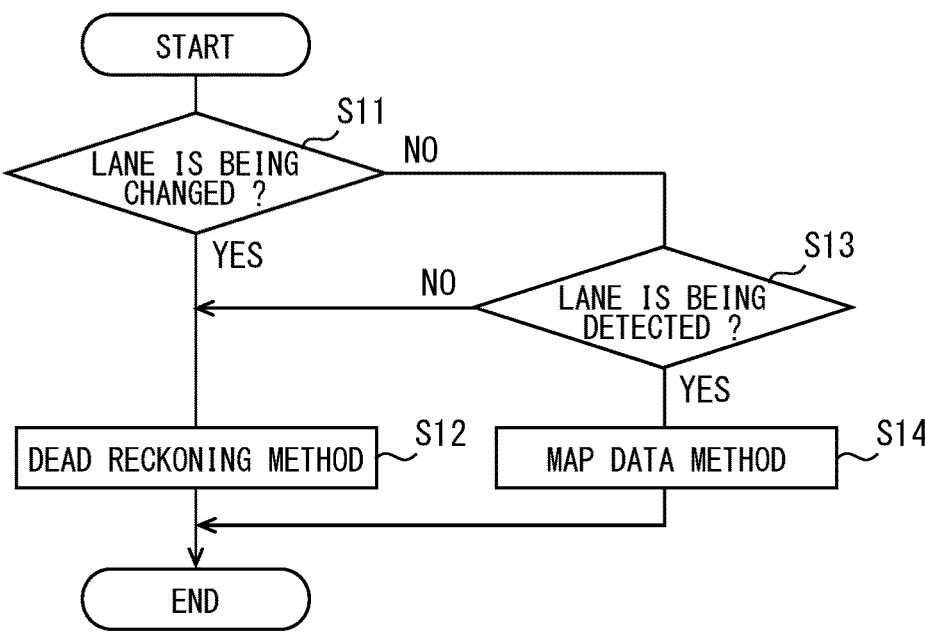
FIG. 9 is a flowchart illustrating another example of switching position estimation methods.
Figure 10:
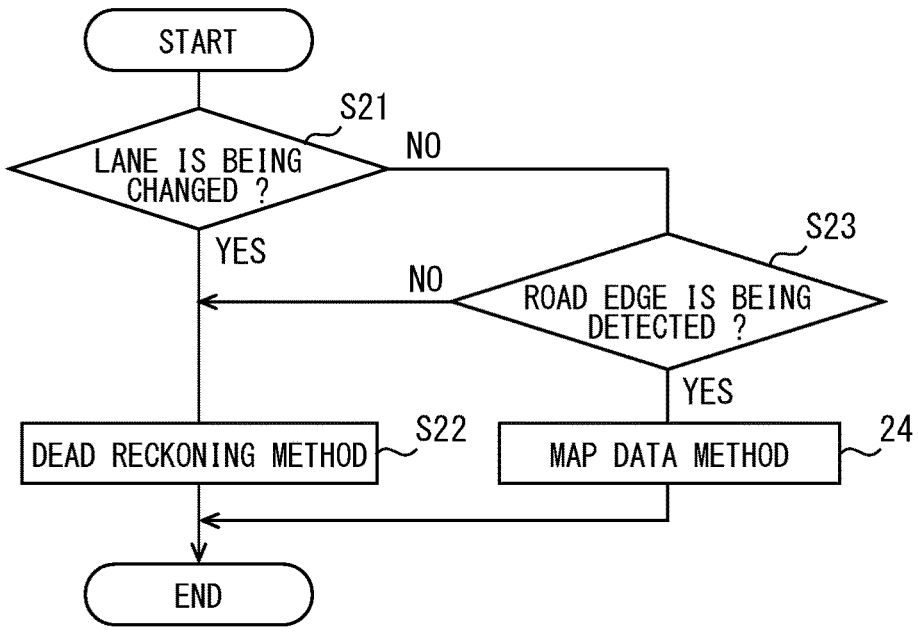
FIG. 10 is a flowchart illustrating another example of switching position estimation methods.

Next, a switching method between the dead reckoning method and the map data method in the position estimation unit 120 will be described. FIGS. 8 to 10 are flowcharts for explaining the switching method. The processes described in FIGS. 8 to 10 are repeatedly executed in a short cycle by the position estimation unit 120.

In step S1, it is determined whether the traveling lane is being changed. When the traveling lane is being changed, the process proceeds to step S2, and when the traveling lane is not being changed, the process proceeds to step S3. In step S2, since the traveling lane is being changed, the self-position is estimated by the dead reckoning method, and the process terminates. In step S3, since the traveling lane is not being changed, the self-position is estimated by the map data method, and the process terminates.

In this manner, the position estimation unit 120 changes the estimation method depending on whether the vehicle 200 is changing lanes. According to this change of the estimation method, advantage of each position estimation method can be taken and errors can be reduced.

Next, the flowchart of FIG. 9 will be described. In step S11, it is determined whether the traveling lane is being changed. When the traveling lane is being changed, the process proceeds to step S12, and when the traveling lane is not being changed, the process proceeds to step S13. In step S13, it is determined whether lanes are being detected. When the lanes are being detected, the process proceeds to step S14, and when the lanes are not being detected, the process proceeds to step S12. A situation where the lanes are not being detected is, for example, a situation where the vehicle is traveling in a no-lane section, or the longitudinal marking is not capable of being detected due to deterioration of the longitudinal marking.

In step S12, since the traveling lane is being changed or the lanes are not being detected, the self-position is estimated by the dead reckoning method, and the process terminates. In step S14, since the traveling lane is not being changed or the lanes are being detected, the position is estimated by the map data method, and the process terminates.

In this manner, the position estimation unit 120 changes the estimation method depending on whether the lanes are being detected. According also to this change of the estimation method, advantage of each position estimation method can be taken and errors can be reduced.

Next, the flowchart of FIG. 10 will be described. In step S21, it is determined whether the traveling lane is being changed. When the traveling lane is being changed, the process proceeds to step S22, and when the traveling lane is not being changed, the process proceeds to step S23. In step S23, it is determined whether a road edge is being detected. When the road edge is being detected, the process proceeds to step S24, and when the road edge is not being detected, the process proceeds to step S22. A situation where the road edge is not being detected is, for example, a situation where the road edge cannot be detected because the vehicle is in a large space such as a parking lot having no road edge or because the road edge is deteriorated.

In step S22, since the traveling lane is being changed or the road edge is not being detected, the self-position is estimated by the dead reckoning method, and the process terminates. In step S24, since the traveling lane is not being changed or the road edge is being detected, the position is estimated by the by the map data method, and the process terminates.

In this manner, the position estimation unit 120 changes the estimation method depending on whether the road edge is being detected. According also to this change of the estimation method, advantage of each position estimation method can be taken and errors can be reduced. The flowcharts of FIGS. 9 and 10 may be executed independently, or only one of the processes of FIGS. 9 and 10 may be executed. Furthermore, the processes in FIGS. 9 and 10 may be combined such that the dead reckoning method is used when both the road edge and lanes are not being detected, and the map data method is used when either one is being detected.

As described above, a vehicle position estimation device 100 of the present embodiment includes a position estimation unit 120 that estimates a self-position of the vehicle 200 on the map based on an external information, a vehicle parameter, and a map data. The position estimation unit 120 estimates the self-position using either the dead reckoning method or the map data method depending on the situation. The dead reckoning method is a method that estimates the self-position using dead reckoning by which the self-position is sequentially updated based on the vehicle parameter. The map data method is a method that estimates the self-position based on the external information and the map data. More specifically, the position estimation unit 120 uses the dead reckoning method when the vehicle 200 is changing lanes, and uses the map data method when the vehicle 200 is not changing lanes. In general, as a duration of the dead reckoning method becomes longer, a cumulative error increases and position estimation accuracy decreases. However, when the vehicle is changing lanes, a recognition of lanes with use of external information becomes unstable, so the dead reckoning method may be better than the map data method using external information. Therefore, since the dead reckoning method is during the vehicle 200 is changing lanes, the duration of the dead reckoning method can be shortened, and the cumulative error can be reduced. As a result, the position estimation accuracy can be increased.

In the present embodiment, the position estimation unit 120 changes the estimation method depending on whether lanes are being detected. When the vehicle 200 is not changing lanes but the lanes are not being detected, the dead reckoning method may be better than the map data method using external information. Therefore, since the dead reckoning method is used during the lanes are not detected, a duration of the dead reckoning method can be shortened, and the cumulative error can be reduced. As a result, the position estimation accuracy can be increased.

Furthermore, in the present embodiment, the position estimation unit 120 changes the estimation method depending on whether a road edge is being detected. When the vehicle 200 is not changing lanes but a road edge is not being detected, the dead reckoning method may be better than the map data method using external information. Therefore, the dead reckoning method is used during the road edge is not being detected, a duration of the dead reckoning can be shortened, and the cumulative error can be reduced. As a result, the position estimation accuracy can be increased.

In the present embodiment, the lane change determination unit 123 determines whether the vehicle 200 is changing lanes by using decrease in distance to one of road edges or increase in distance to the other of the road edges. Since it is determined whether the traveling lane is changed by using the distance to the road edge, the lane change determination unit 123 is capable of determining occurrence of the lane change even when a longitudinal marking cannot be detected.

In the present embodiment, the lane change determination unit 123 determines that the vehicle has completed the lane change when a lane having a highest reliability calculated by the reliability calculation unit 121 among the lanes changes from one lane to another. Thus, the lane change determination unit 123 is capable of determining the completion of the lane change by using the reliability.

Other Embodiments

The present disclosure is not limited to the preferred embodiments of the present disclosure described above. Various modifications may be made without departing from the subject matters of the present disclosure.

It should be understood that the configurations described in the above-described embodiments are example configurations, and the present disclosure is not limited to the foregoing descriptions.

In the above-described first embodiment, the information acquisition unit 110 has the functions of an external information acquisition unit, a vehicle parameter acquisition unit, a satellite positioning acquisition unit, and a map data acquisition unit, but is not limited to a configuration in which these are integrated, and each function may be realized in separate units.

In the above-described first embodiment, the functions realized by the vehicle position estimation device 100 may be realized by hardware and software different from those described above or by a combination of the hardware and the software. The vehicle position estimation device 100 may communicate with, for example, another control device, and the other control device may execute a part or all of the process. When the vehicle position estimation device 100 is realized by an electronic circuit, the vehicle position estimation device 100 may be realized by a digital circuit or an analog circuit, including a large number of logic circuits.

Whereas the vehicle position estimation device 100 is used in a vehicle in the above-described first embodiment, the vehicle position estimation device 100 is not limited to a state being mounted on a vehicle, and at least a part of the vehicle position estimation device 100 may not be mounted on a vehicle.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

The invention claimed is:

1. A vehicle position estimation device mounted on a vehicle, comprising at least one of (i) a circuit and (ii) a processor having a memory storing computer program code executable by the processor, the at least one of the circuit and the processor configured to cause the vehicle position estimation device to perform:

acquiring external information, which includes image data obtained by a camera, regarding objects and road markings around the vehicle, a vehicle parameter, which includes vehicle speed and a traveling direction, related to traveling of the vehicle, and map data including road information about lanes;

determining whether the vehicle is changing lanes based on the external information, the vehicle parameter, and the map data; and estimating a self-position of the vehicle on a map based on the external information, the vehicle parameter, and the map data, wherein the estimating includes estimating, when the vehicle is changing lanes, the self-position using dead reckoning by which the self-position is sequentially updated based on the vehicle parameter without using the external information and the map data, based on determining that the vehicle is changing lanes, and estimating, when the vehicle is not changing lanes, the self-position based on the external information and the map data without using the dead reckoning, based on determining that the vehicle is not changing lanes, wherein the dead reckoning is used for estimating the self-position depending on whether the vehicle is changing lanes, and autonomous driving of the vehicle is supported using the estimated self-position.

2. The vehicle position estimation device according to claim 1, wherein the estimating includes estimating the self-position based on the external information, and the map data, based on determining that the vehicle is not changing lanes, and the external information indicating that lanes are being detected, and estimating the self-position using the dead reckoning based on determining that the vehicle is not changing lanes and the external information not indicating that the lanes are being detected.

3. The vehicle position estimation device according to claim 1, wherein the acquiring includes acquiring distances from the vehicle to road edges located rightward and leftward of the vehicle, the estimating includes estimating the self-position based on the external information and the map data, based on determining that the vehicle is not changing lanes and the external information indicates that the distances to the road edges are being detected, and estimating the self-position using the dead reckoning based on determining that the vehicle is not changing lanes and the external information does not indicate that the distances to the road edges are being detected.

4. The vehicle position estimation device according to claim 1, wherein the acquiring includes acquiring distances from the vehicle to two road edges located rightward and leftward of the vehicle, and the determining includes determining whether the vehicle is changing lanes toward one of the two road edges by using decrease in distance to the one of the two road edges or increase in distance to an other of the two road edges.

5. The vehicle position estimation device according to claim 1, wherein the at least one of the circuit and the processor is configured to cause the vehicle position estimation device to perform calculating a reliability of each lane based on the external information and the map data, based on determining that the vehicle is traveling on a road having multiple lanes, the reliability of each lane indicates a probability of the vehicle being traveling in the lane among the lanes, and the determining includes determining that the vehicle is not changing lanes and has completed a lane change when a lane having a highest reliability calculated by the calculating among the lanes changes from one lane to another.

6. The vehicle position estimation device according to claim 5, wherein the at least one of the circuit and the processor is configured to cause the vehicle position estimation device to perform calculating the reliability of a lane, which is specified based on the numbers of lanes located on both sides of the vehicle in the external information, to be higher than the reliabilities of the other lanes when the number of lanes in the map data matches the total number of lanes in the external information.

7. The vehicle position estimation device according to claim 5, wherein the at least one of the circuit and the processor is configured to cause the vehicle position estimation device to perform:

comparing the road markings in the external information with the road markings included in the map data; and setting the reliability of a lane having a matching road marking to be higher than the reliabilities of the other lanes when an acquired road marking matches a road marking in the map data.

8. The vehicle position estimation device according to claim 5, wherein the at least one of the circuit and the processor is configured to cause the vehicle position estimation device to perform setting the reliabilities of all lanes to be equal when the number of lanes in the map data does not match the total number of lanes in the external information.

9. The vehicle position estimation device according to claim 1, wherein the acquiring includes the acquiring distances from the vehicle to road edges located rightward and leftward of the vehicle, the road edges being different from a longitudinal marking and being located outside of the longitudinal marking, and the estimating includes estimating the self-position based on the external information and the map data, based on determining that the vehicle is not changing lanes, and the external information indicates that the distances to the road edges are being detected, and estimating the self-position using the dead reckoning based on determining that the vehicle is not changing lanes, and the external information does not indicate that the distances to the road edges are being detected.

10. The vehicle position estimation device according to claim 1, wherein the acquiring includes acquiring distances from the vehicle to road edges located rightward and leftward of the vehicle, the road edges being different from a longitudinal marking and being located outside of the longitudinal marking, and the determining includes determining whether the vehicle is changing lanes toward one of the road edges by using decrease in distance to the one of the road edges or increase in distance to the other of the road edges.

* * * * *